United States Patent
Hou et al.

(10) Patent No.: US 7,833,031 B2
(45) Date of Patent: Nov. 16, 2010

(54) CARD FIXING MODULE

(75) Inventors: Chien-Hung Hou, Taipei (TW);
Chiu-Lang Huang, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 0 days.

(21) Appl. No.: 12/541,082

(22) Filed: Aug. 13, 2009

(65) Prior Publication Data
US 2010/0075519 A1    Mar. 25, 2010

(30) Foreign Application Priority Data
Sep. 25, 2008   (TW) .............................. 97136849 A

(51) Int. Cl.
*H01R 13/62* (2006.01)
(52) U.S. Cl. ...................... 439/155; 439/923
(58) Field of Classification Search ................ 439/155, 439/159, 923, 630, 638
See application file for complete search history.

(56) References Cited
U.S. PATENT DOCUMENTS

| | | | | |
|---|---|---|---|---|
| 4,820,176 A | * | 4/1989 | Niikura | 439/152 |
| 5,791,930 A | * | 8/1998 | Tabata et al. | 439/345 |
| 6,059,597 A | * | 5/2000 | Endo et al. | 439/352 |
| 7,155,266 B2 | | 12/2006 | Stefansen | |
| 7,335,037 B2 | * | 2/2008 | Razafiarivelo et al. | 439/157 |
| 7,484,271 B2 | * | 2/2009 | Oshima et al. | 16/366 |
| 7,567,829 B2 | * | 7/2009 | Lai et al. | 455/575.3 |
| 2003/0069040 A1 | | 4/2003 | Chuang et al. | |
| 2006/0105633 A1 | | 5/2006 | Richter et al. | |
| 2008/0132120 A1 | * | 6/2008 | Tsai | 439/630 |

* cited by examiner

*Primary Examiner*—T C Patel
*Assistant Examiner*—Harshad C Patel

(57) ABSTRACT

A card fixing module for fixing a card is provided. The card fixing module comprises a housing, a card holder and an elastic element. The housing comprises an opening and a through hole, wherein the through hole corresponds to the opening. The card holder comprises a body portion, an abutting portion and a post, wherein the abutting portion is connected to the body portion, the post is connected to the body portion, the post passes through the through hole, the card holder is moved between a first position and a second position, and wherein when the card holder is in the first position, the abutting portion abuts the housing, and the card is received in the housing. The elastic element is telescoped on the post, an end of the elastic element contacts the housing, and the other end of the elastic element contacts the body portion, wherein the elastic element applies an elastic force to the card holder to move the card holder from the first position to the second position to push the card out of the opening.

10 Claims, 5 Drawing Sheets

CARD FIXING MODULE

CROSS REFERENCE TO RELATED APPLICATIONS

This Application claims priority of Taiwan Patent Application No. 097136849, filed on Sep. 25, 2008, the entirety of which is incorporated by reference herein.

BACKGROUND OF THE INVENTION

1. Field of the Invention

The present invention relates to a card fixing module, and in particular relates to a card fixing module for fixing a SIM card.

2. Description of the Related Art

FIG. 1 shows a conventional design for fixing a SIM card. An electronic device comprises a card receiving portion 11 and a positioner 12. The SIM card 20 is inserted and fixed in the card receiving portion 11.

Conventionally, when the SIM card 20 is removed from the card receiving portion 11, the user pushes the SIM card 20 out of the card receiving portion 11 by friction force between his finger and the SIM card 20. In conventional designs, it is difficult for the SIM card 20 to be removed.

Additionally, conventional designs are not fool-proof designs. When the SIM card 20 is inserted into the card receiving portion 11 in a wrong direction, the user does not immediately discover the error.

BRIEF SUMMARY OF THE INVENTION

A detailed description is given in the following embodiments with reference to the accompanying drawings.

A card fixing module for fixing a card is provided. The card fixing module comprises a housing, a card holder and an elastic element. The housing comprises an opening and a through hole, wherein the through hole corresponds to the opening. The card holder comprises a body portion, an abutting portion and a post. The abutting portion is connected to the body portion, the post is connected to the body portion, the post passes through the through hole, and the card holder is moved between a first position and a second position, wherein when the card holder is in the first position, the abutting portion abuts the housing, and the card is received in the housing. The elastic element is telescoped on the post, an end of the elastic element contacts the housing, and the other end of the elastic element contacts the body portion, wherein the elastic element applies an elastic force to the card holder to move the card holder from the first position to the second position to push the card out of the opening.

Utilizing the card fixing module of the embodiment of the invention, the card can be sprung out after the user presses the pressing portion. Therefore, the card can be more easily accessed.

Additionally, the card fixing module of the embodiment of the invention is fool-proof design, which prevents users from inserting the card in wrong direction. As well, the hooks of the embodiment of the invention prevents the card from sliding out from the card fixing module.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
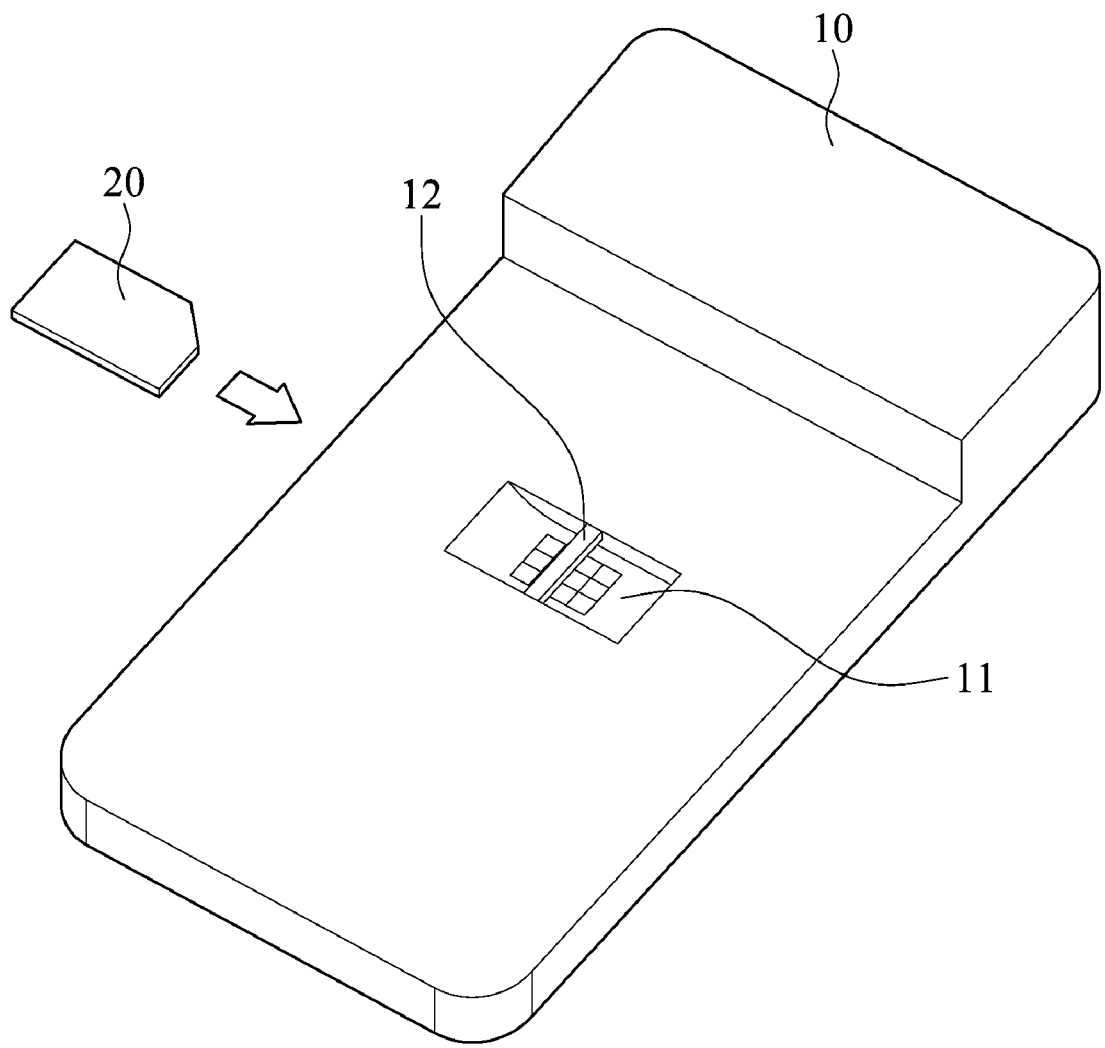
FIG. 1 shows a conventional design for fixing a SIM card.
Figure 2:
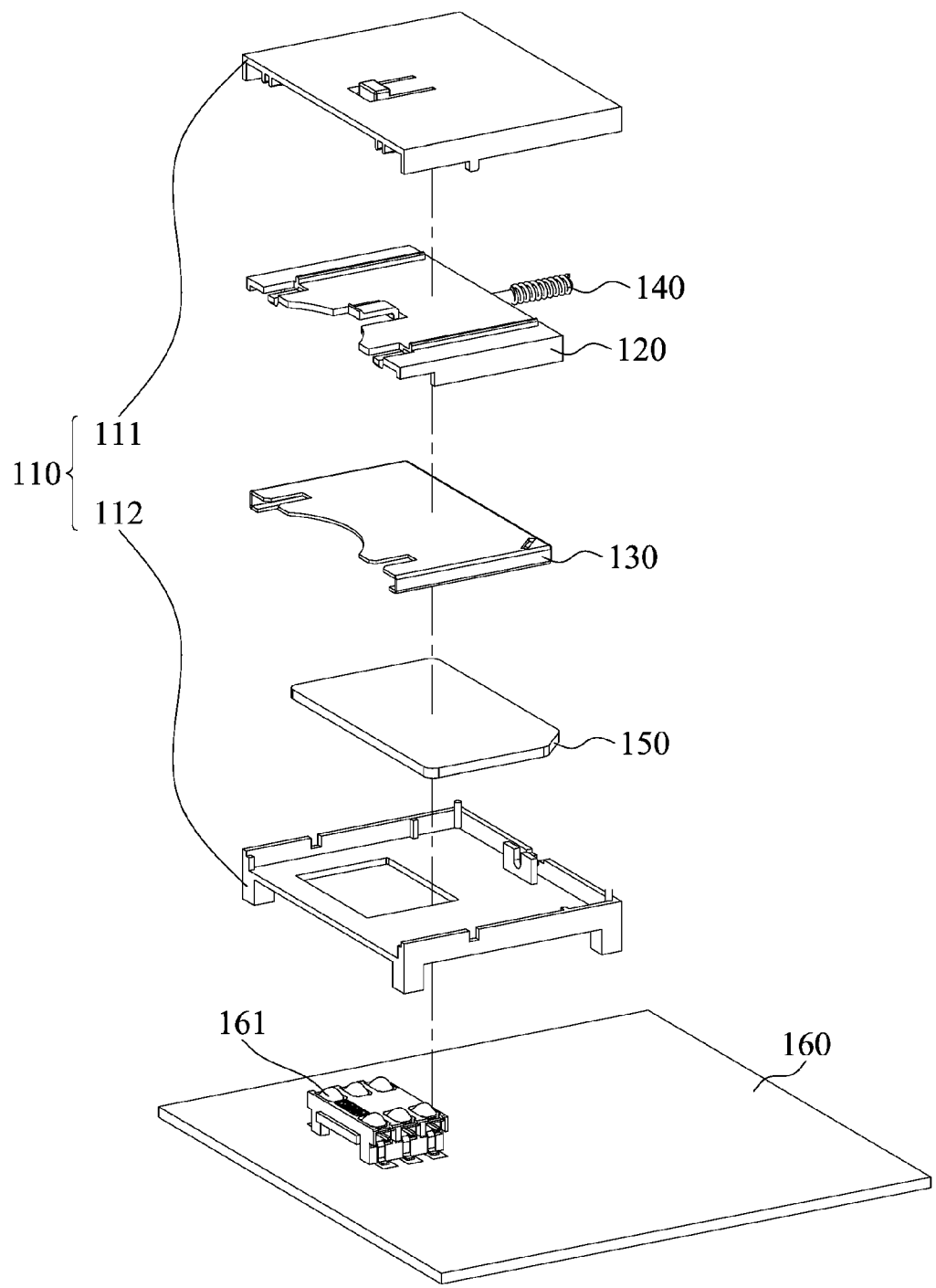
FIG. 2 is an exploded view of a card fixing module of an embodiment of the invention.

FIG. 2 is an exploded view of a card fixing module 100 of an embodiment of the invention, comprising a housing 110, a card holder 120, a card holding element 130 and an elastic element 140. The housing 110 comprises an upper housing portion 111 and a lower housing portion 112. The card fixing module 100 receives a card 150. The card fixing module 100 is disposed on a circuit board 160. A connector 161 is disposed on the circuit board 160. The connector 161 extends into the housing 110, and is electrically connected to the card 150.

Figure 3:
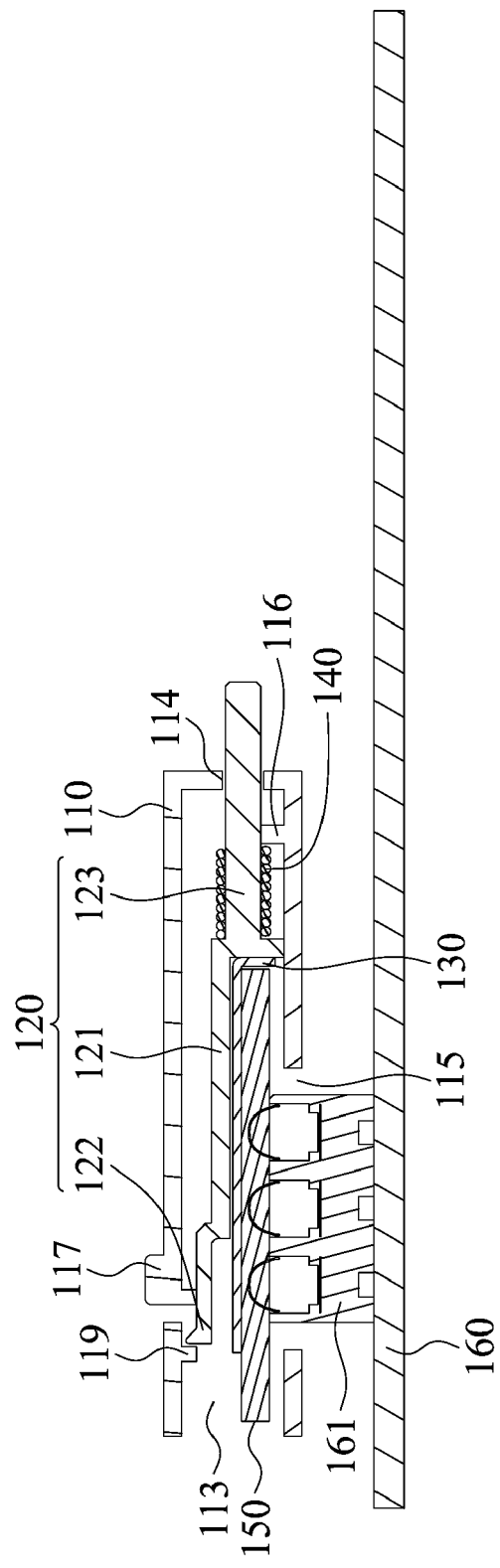
FIG. 3 is a sectional view of the card fixing module of the embodiment of the invention.

FIG. 3 is a sectional view of the card fixing module 100 of the embodiment of the invention. The housing further comprises an opening 113, a through hole 114 and a connection opening 115. The through hole 114 faces the opening 113. The connector 161 enters housing through the connection opening 115 to be electrically connected to the card 150.

The card holder 120 comprises a body portion 121, an abutting portion 122 and a post 123. The abutting portion 122 is connected to the body portion 121. The post 123 is connected to the body portion 122. The post 123 passes the through hole 114. The card holder 120 is moved between a first position (as shown in FIG. 3) and a second position. When the card holder 120 is in the first position, the abutting portion 122 abuts the housing 110, and the card 150 is received in the housing 110. The card holder 120 can be made of metal.

The card holding element 130 is sandwiched between the card holder 120 and the card 150, which can be made of metal.

The elastic element 140 is telescoped on the post 123. An end of the elastic element 140 contacts the housing 110, and the other end thereof contacts the body portion 121. The elastic element 140 provides an elastic force to the card holder 120 to move the card holder 120 from the first position to the second position to push the card 150 out of the opening.

The elastic element 140 is a compression spring. The housing 110 comprises a stopper 116 formed on an inner wall of the housing 110. An end of the elastic element 140 contacts the stopper 116, and the other end thereof contacts the body portion 121.

Figure 4A:
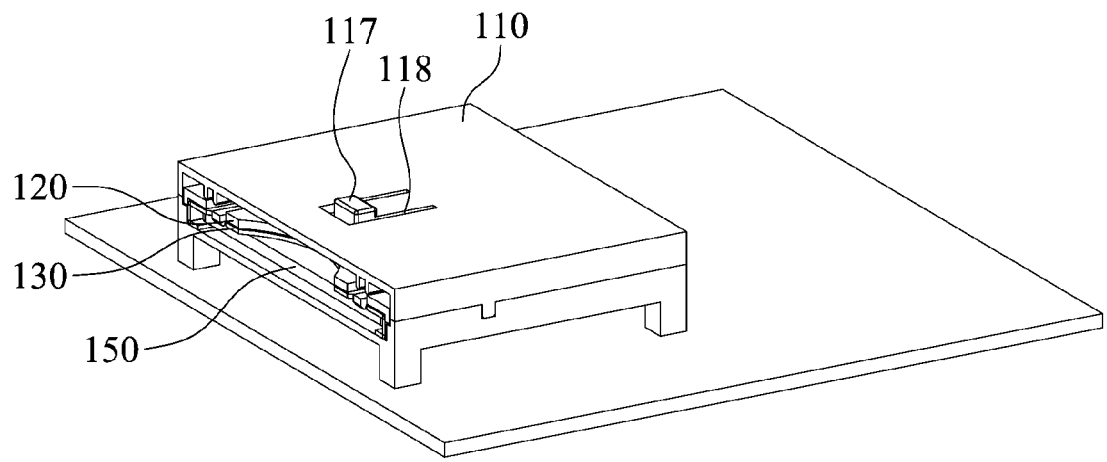
FIG. 4A is an assembly view of the card fixing module, wherein a card holder is in the first position.
Figure 4B:
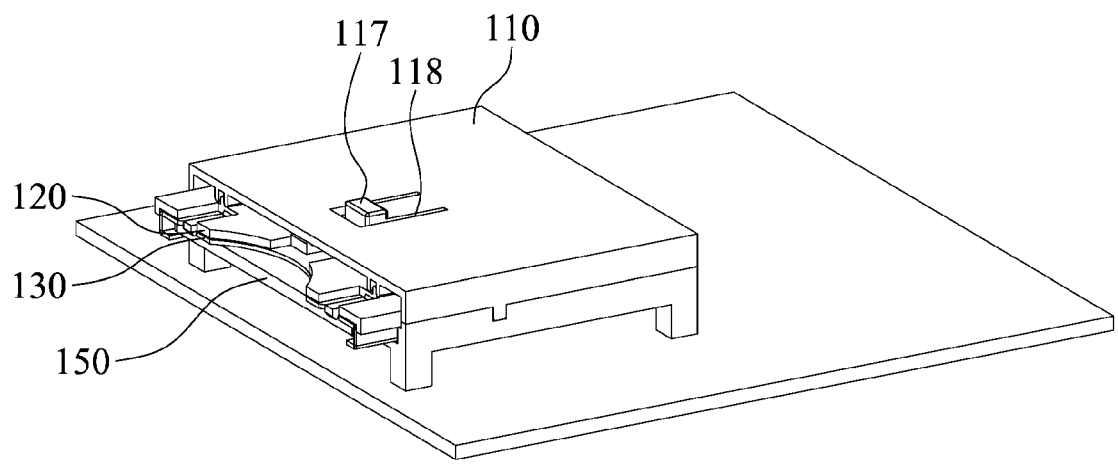
FIG. 4B shows the card holder in the second position and partially out of the opening.

FIG. 4A is an assembly view of the card fixing module 100, wherein the card holder 120 is in the first position. FIG. 4B shows the card holder 120 in the second position and partially out of the opening 113.

With reference to FIG. 4A, the housing 110 further comprises a pressing portion 117 and a U-shaped slot 118. The U-shaped slot 118 is formed around the pressing portion 117. With reference to FIG. 3, the housing 110 further comprises a protrusion 119 formed on the inner wall of the housing 110. When the card holder 120 is in the first position, the abutting portion 122 abuts the protrusion 119, and the pressing portion 117 is above the abutting portion 122. When the pressing portion 117 is pressed, the pressing portion 117 pushes the abutting portion 122 to elastically deform the abutting portion 122 and detach the abutting portion 122 from the protrusion 119, wherein the card holder 120 is moved from the first position to the second position by the elastic force of the elastic element 140.

Figure 5:
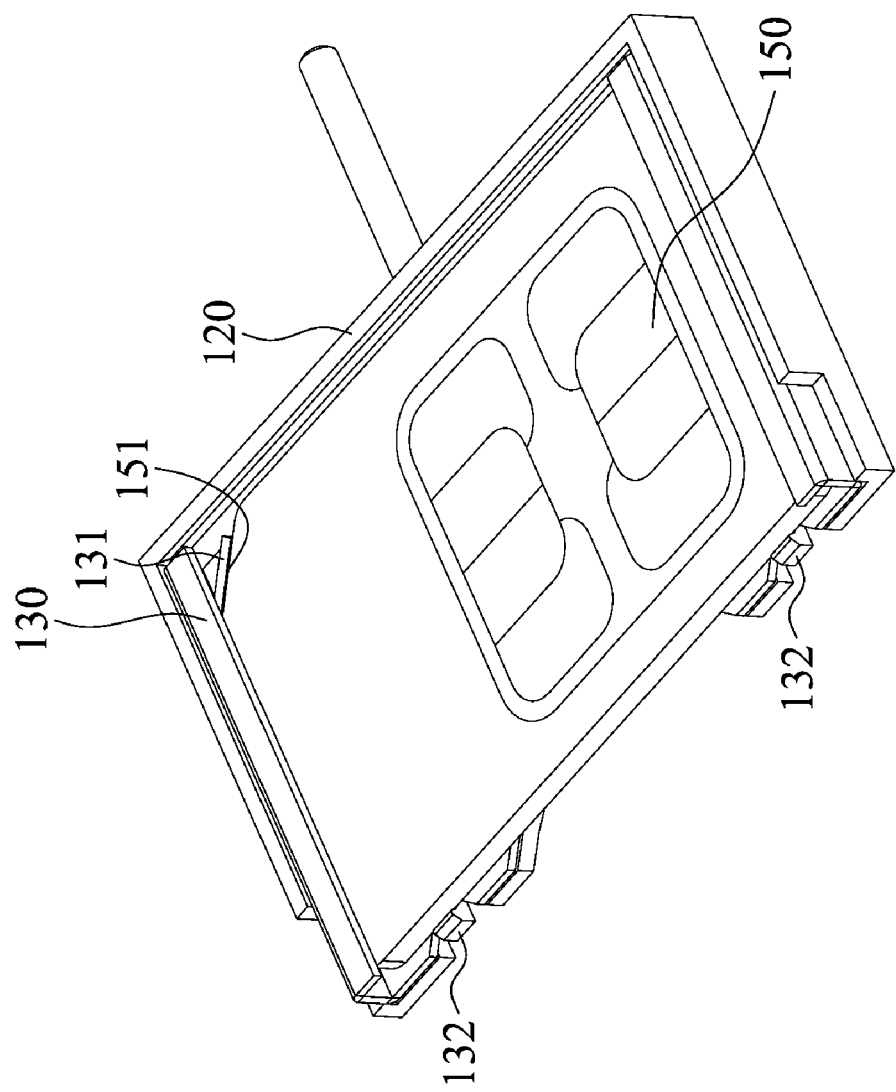
FIG. 5 shows a detailed structure of a card holding element and the car holder.

The card holding element 130 is connected to the card holder 120 and contacting the card 150. FIG. 5 shows a detailed structure of the card holding element 130 and the car holder 120. The card holding element 130 is rectangular. The card holding element 130 comprises a jut 131 formed on a corner thereof. When the card is inserted into the card holding element 130, the jut 131 contacts a notch 151 of the card 150 to prevent user from inserting the card 150 in a wrong direction (fool-proof design). The card holding element 130 further comprises hooks 132 disposed on an edge thereof. When the card 150 is disposed into the card holding element 130, the hooks 132 abut the card 150 preventing the card 150 from sliding out therefrom.

Utilizing the card fixing module of the embodiment of the invention, the card can be sprung out after the user presses the pressing portion. Therefore, the card can be accessed more easily.

Additionally, the card fixing module of the embodiment of the invention has fool-proof design, which prevents users from inserting the card in a wrong direction. As well, the hooks of the embodiment of the invention prevent the card from sliding out from the card fixing module.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A card fixing module, for fixing a card, comprising:
a housing, comprising an opening and a through hole corresponds to the opening;
a card holder, comprising a body portion, an abutting portion and a post, wherein the abutting portion is connected to the body portion, the post is connected to the body portion, the post passes through the through hole, the card holder moves between a first position and a second position, and when the card holder is in the first position, the abutting portion abuts the housing, and the card is received in the housing; and
an elastic element, telescoped on the post, wherein an end of the elastic element contacts the housing, and the other end of the elastic element contacts the body portion, and wherein the elastic element applies an elastic force to the card holder to move the card holder from the first position to the second position to push the card out of the opening.

2. The card fixing module as claimed in claim 1, wherein the elastic element is a compression spring.

3. The card fixing module as claimed in claim 1, wherein the housing comprises a stopper formed on an inner wall of the housing, an end of the elastic element contacts the stopper, and the other end of the elastic element contacts the body portion.

4. The card fixing module as claimed in claim 1, wherein the housing further comprises a protrusion formed on an inner wall of the housing, and the abutting portion abuts the protrusion when the card holder is in the first position.

5. The card fixing module as claimed in claim 4, wherein the housing further comprises a pressing portion, and when the card holder is in the first position, the pressing portion is above the abutting portion, and when the pressing portion is pressed, the pressing portion pushes the abutting portion to elastically deform the abutting portion and detach the abutting portion from the protrusion, and the card holder is moved from the first position to the second position by the elastic element.

6. The card fixing module as claimed in claim 5, wherein the housing comprises a U-shaped slot, formed around the pressing portion.

7. The card fixing module as claimed in claim 1, wherein the housing further comprises a connection opening formed on the housing, and a connector enters the housing through the connection opening to contact the card.

8. The card fixing module as claimed in claim 1, further comprising a card holding element, sandwiched between the card holder and the card.

9. The card fixing module as claimed in claim 8, wherein the card holding element is rectangular, the card holding element comprises a jut formed on a corner thereof, and when the card is inserted into the card holding element, the jut contacts a notch of the card.

10. The card fixing module as claimed in claim 9, wherein the card holding element further comprises a hook, the hook is disposed on an edge of the card holding element, and when the card is inserted into the card holding element, the hook abuts the card to prevent the card from sliding out therefrom.

* * * * *